April 3, 1956     R. J. LINDSEY     2,740,540
SHELL TRANSFER MECHANISM
Filed Nov. 12, 1952     5 Sheets-Sheet 2

INVENTOR.
Robert J. Lindsey
BY
Orin O. B. Garner
Atty.

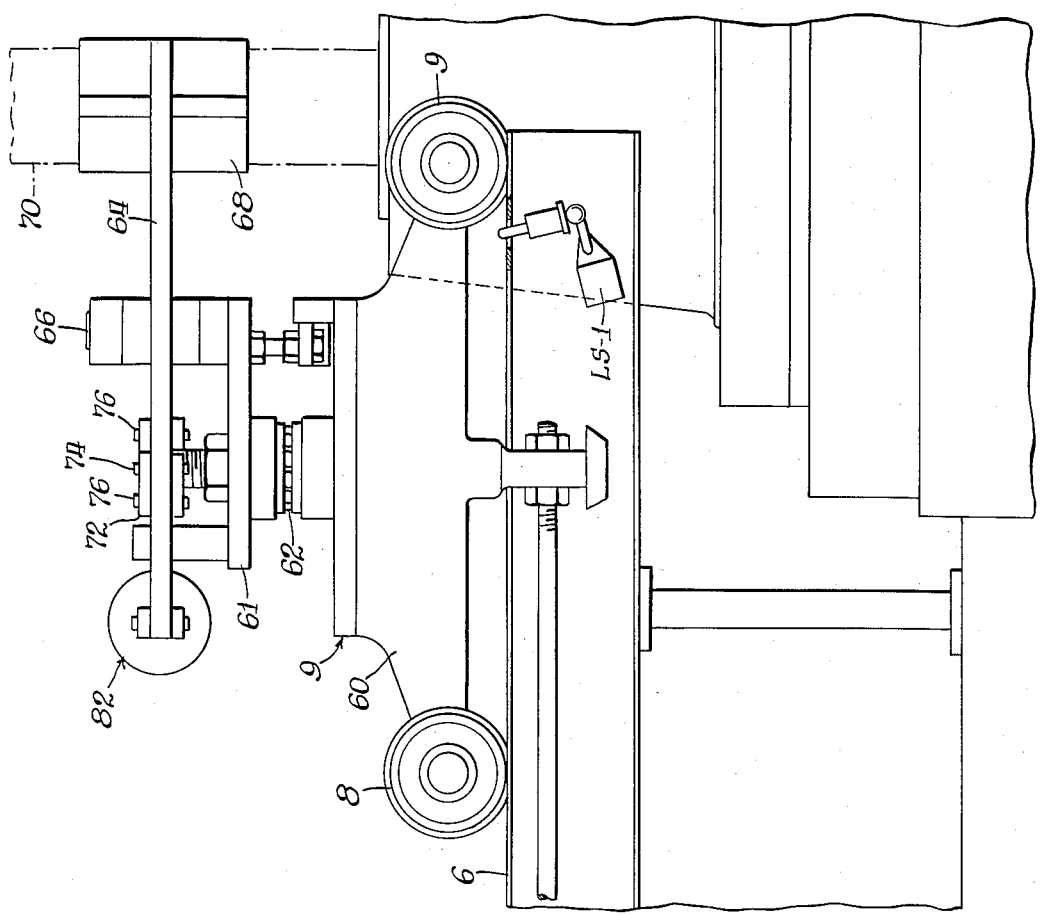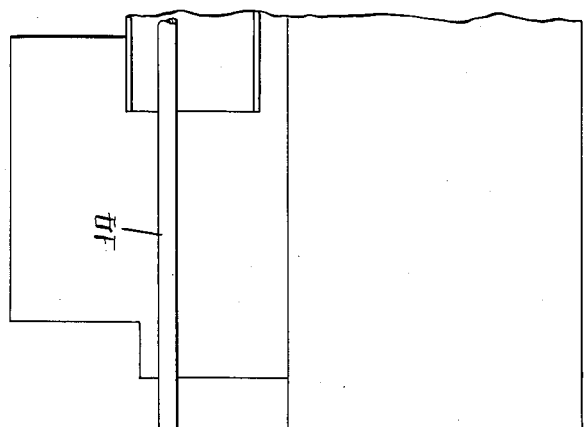

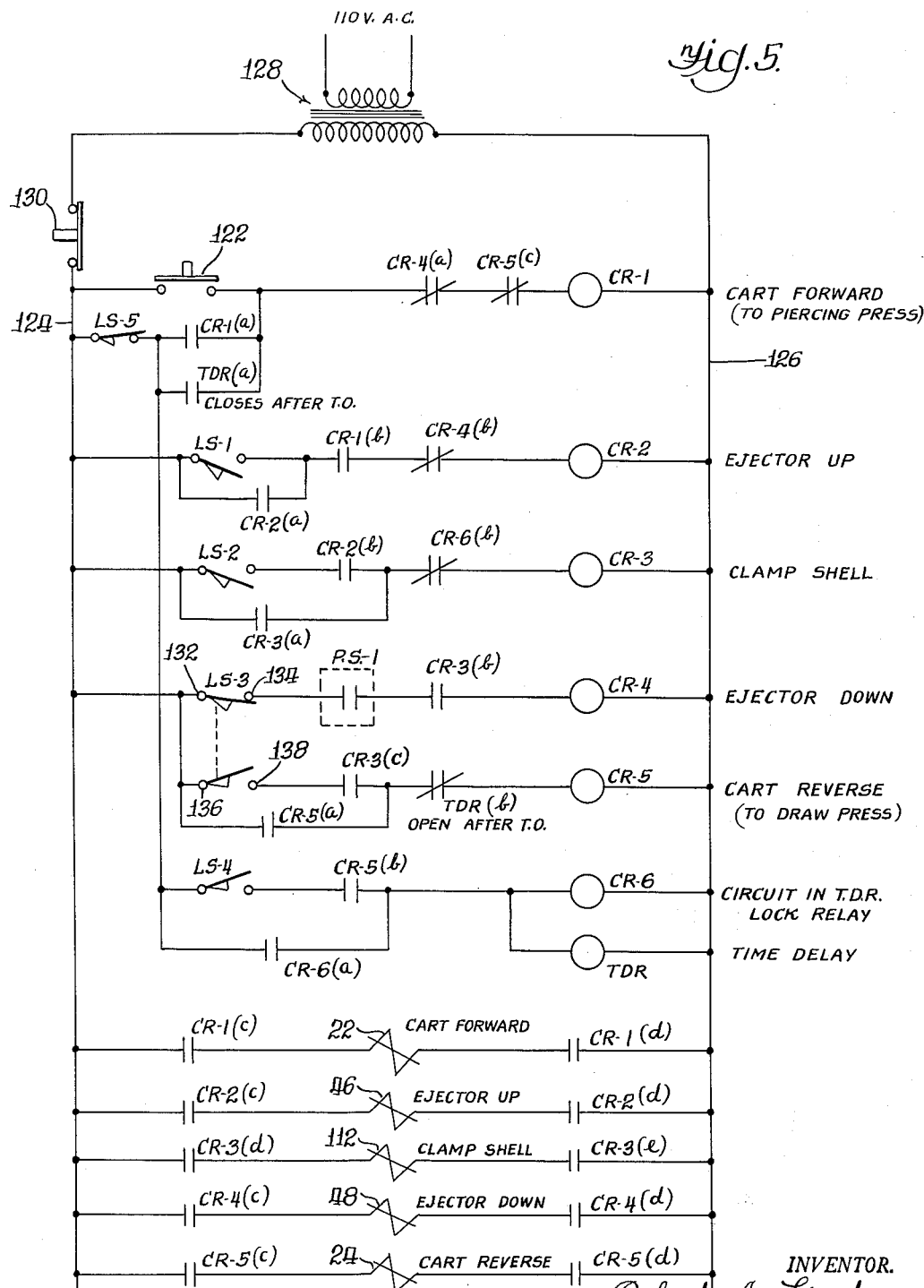

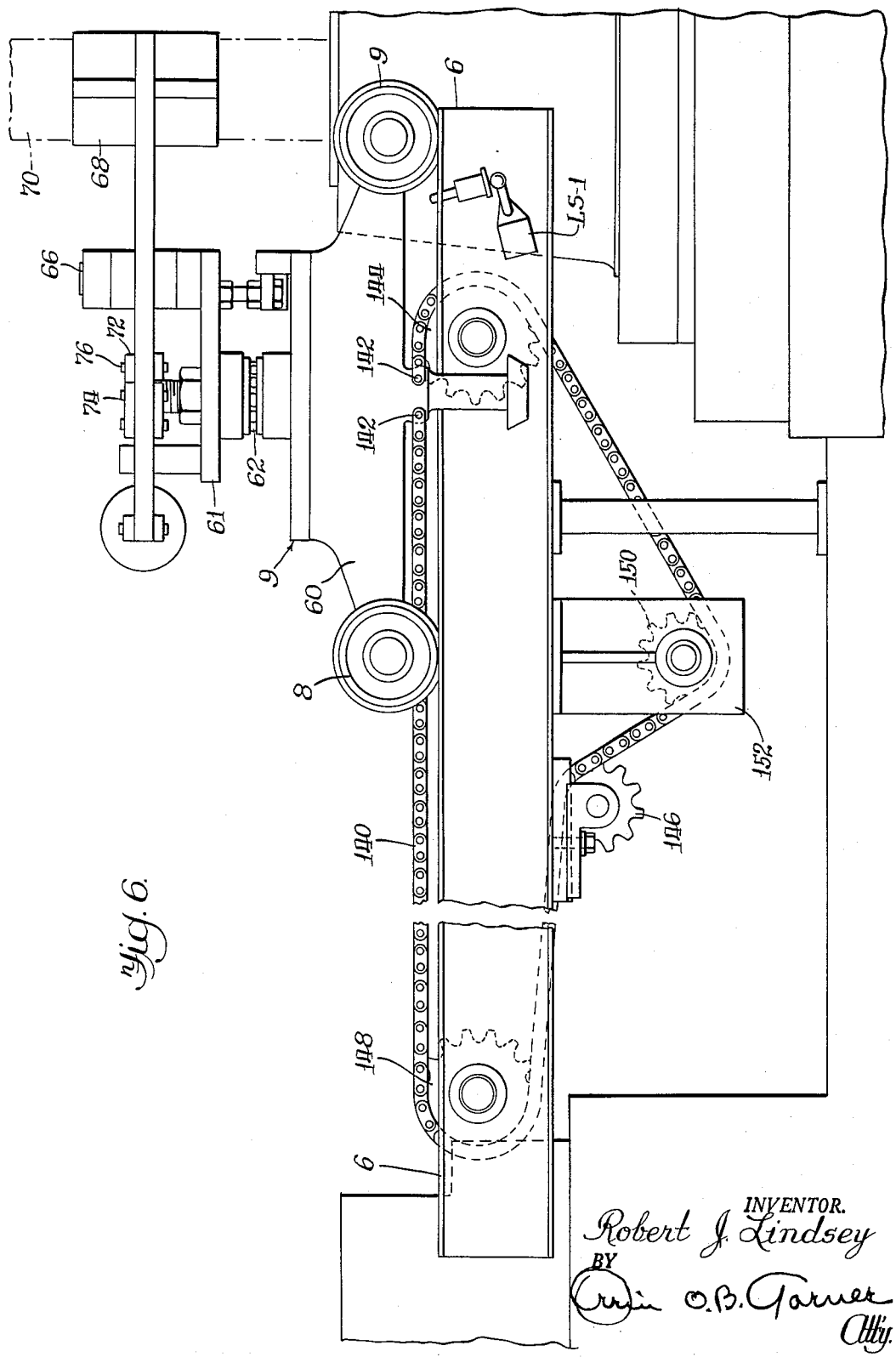

United States Patent Office

2,740,540
Patented Apr. 3, 1956

2,740,540

SHELL TRANSFER MECHANISM

Robert J. Lindsey, Cincinnati, Ohio, assignor to American Steel Foundries, Chicago, Ill., a corporation of New Jersey Application November 12, 1952, Serial No. 320,008

12 Claims. (Cl. 214—151)

This invention relates to a transfer device or system for transferring a workpiece between the working devices such as hydraulic presses adapted to successively act on the workpiece.

A primary object of the invention is to devise a simple economical and efficient transfer device having relatively few parts and capable of long life in service.

A more specific object of the invention is to provide a transfer cart movable back and forth between the working devices and carrying a clamping mechanism which is automatically rotatable to face the working device toward which the cart is moving, whereby the mechanism may receive a workpiece from one of the devices and may insert the workpiece into the other device without turning or steering the cart.

Still another object of the invention is to devise a transfer device, such as above described, having means for automatically actuating the cart and its clamping mechanism, thereby enabling a single operator to control the transfer system and both working devices.

The foregoing and other objects and advantages of the invention will become apparent from a consideration of the following specification and the accompanying drawings, wherein:

Figure 4 is a side elevational view of the structure shown in Figure 3;

Figure 5 is a wiring diagram of an electrical system associated with the hydraulic and pneumatic circuits shown in Figures 1 and 2; and Figure 6 is a side elevational view similar to Figure 4 but showing a modified mechanism for moving the cart.

Figure 1:
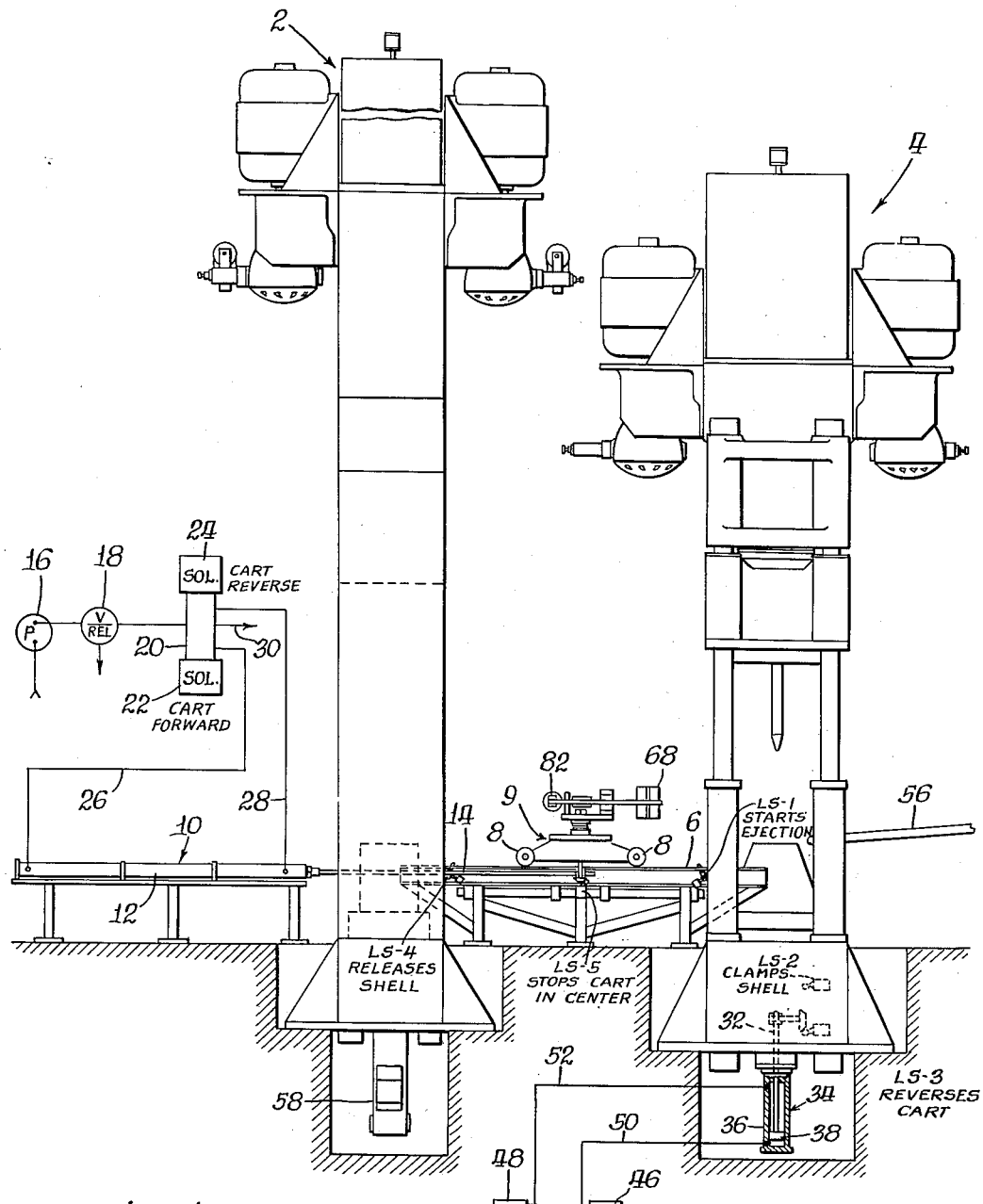
Figure 1 is a side elevational, general assembly view of an apparatus embodying a preferred form of the invention with certain of the hydraulic actuating circuits diagrammatically illustrated.
Figure 2:
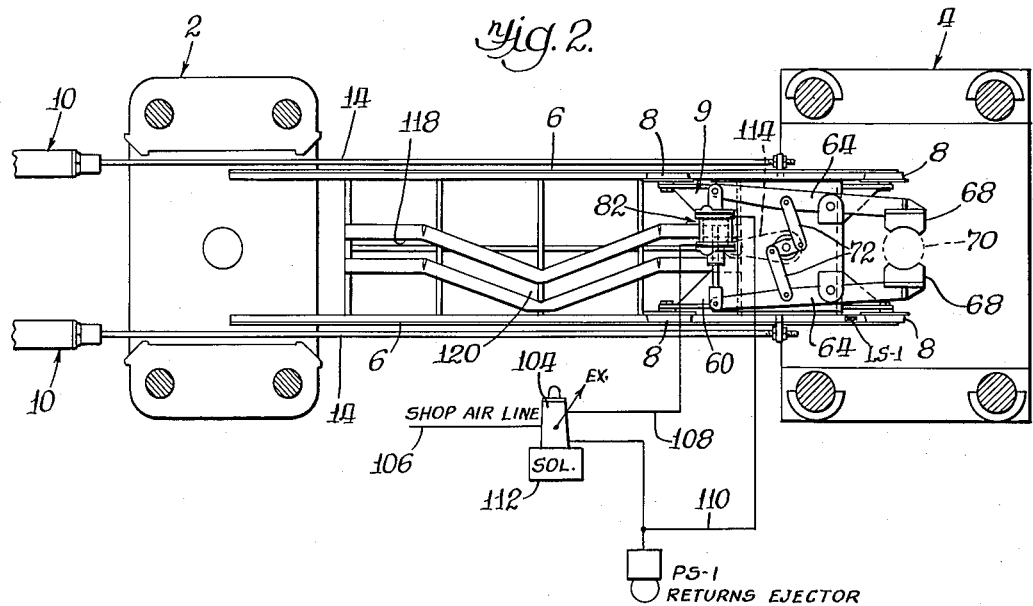
Figure 2 is a top plan view, partly in section, of the apparatus shown in Figure 1, with the pneumatic clamping circuit diagrammatically illustrated.

Referring first to Figures 1 and 2, the invention is illustrated as applied to an apparatus for piercing and drawing shells. This apparatus comprises a conventional drawing press, generally designated 2, and having a capacity of, for example, 350 tons. Aligned with the drawing press 2 is a conventional piercing press 4 having a capacity of, for example, 500 tons. The drawing and piercing mechanisms and actuating means of presses 2 and 4 are not illustrated or described in detail inasmuch as they form no part of the present invention except as hereinafter discussed. The presses 2 and 4 may be regarded as stations at which any desired work is performed as hereinafter described.

Extending between the presses 2 and 4 are rails 6, supporting wheels 8 of a transfer cart, generally designated 9 and hereinafter described in detail. The transfer cart 9 is reciprocated between the presses 2 and 4 as, for example, by one or more reciprocal hydraulic motors, generally designated 10, two of such motors being illustrated in the drawings. Each motor comprises a cylinder 12 containing a piston (not shown) having a piston rod 14 connected to the cart 9 for moving the same linearly back and forth between the presses 2 and 4 as hereinafter described in connection with the operation of the novel transfer device.

The motor 10 is operated by a fluid pressure circuit illustrated in the drawings as a hydraulic circuit comprising a pump 16 connected through a conventional safety relief valve 18 to an operating valve 20 actuated as by solenoids 22 and 24 to advance and return positions, respectively. In advance position of the valve 20 with the solenoid 22 energized and the solenoid 24 de-energized, pressure fluid from the pump 16 is delivered by the valve 20 to an advance line 26, and fluid from a return or pull-back line 28 is exhausted by the valve 20 to an exhaust or discharge line 30, whereupon the piston rod 14 moves the cart 9 toward the piercing press 4. In the return or pullback position of valve 20 with the solenoid 22 de-energized and the solenoid 24 energized, pressure fluid from the pump 16 is delivered by the valve 20 to the pullback line 28, and, at the same time, fluid is exhausted by the valve 20 from the advance line 26 to the discharge line 30, whereupon the piston rod 14 moves the cart 9 toward the drawing press 2. In neutral position of the valve 20 with both solenoids 22 and 24 de-energized, pressure fluid from the pump is exhausted to the discharge line 30.

The piercing press 4 comprises a conventional ejector 32 for ejecting pierced workpieces as hereinafter described. The ejector 32 is actuated by a conventional, reciprocal hydraulic motor 34 having a cylinder 36 containing a piston 38. The motor 34 is operated by a fluid pressure system illustrated as a hydraulic system comprising a pump 43 connected through a conventional safety relief valve 42 to an operating valve 44 actuated as by solenoids 46 and 48 to advance and return or pullback positions, respectively. In advance position of the valve 44, with solenoid 46 energized and solenoid 48 de-energized, pressure fluid from the pump 40 is delivered to an advance line 50, and fluid from a return or pullback line 52 is exhausted through the valve 44 to a relief or discharge line 54, whereupon the piston 38 is urged upwardly on advance stroke to actuate the ejector 32 as hereinafter described. In the return or pullback position of the valve 44, with solenoid 48 energized and solenoid 46 de-energized, pressure fluid is exhausted from the advance line 50 to the discharge line 54, and pressure fluid from the pump 43 is delivered by the valve 44 to the return or pullback line 52, whereupon the piston 38 is urged downwardly on return or pullback stroke to retract the ejector 32 to the position shown in Figure 1. In neutral position of the valve 44, with both solenoids 46 and 48 de-energized, fluid pressure from the pump 40 is exhausted to the discharge line 54.

It will be noted that workpieces may be loaded as by a conveyer diagrammatically indicated at 56 into the piercing press 4 from which the workpieces are transferred to the drawing press 2 by the cart 9, as hereinafter described. After the workpieces have been drawn in the press 2, they are unloaded in the usual manner from beneath press 2 by a conventional conveyer diagrammatically illustrated at 58.

Figure 3:
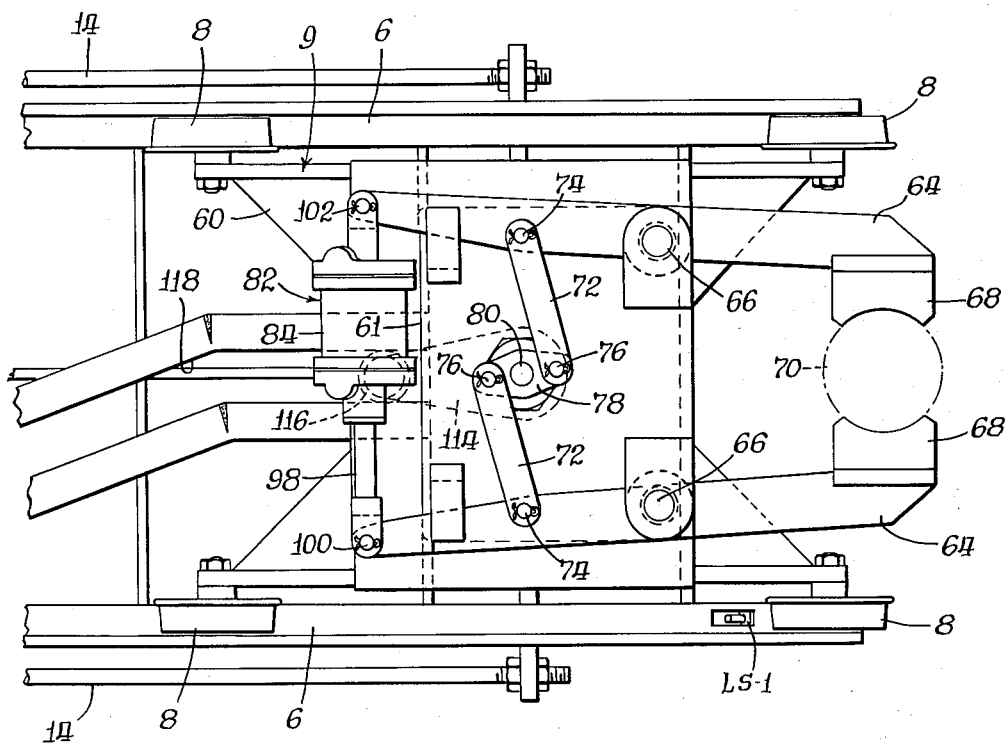
Figure 3 is an enlarged top plan view of the transfer cart and the rails and track associated therewith.

Referring now to Figures 3 and 4 which illustrate the cart 9 in detail, it will be seen that the cart comprises a body 60 supported by the before mentioned wheels 8 on the rails 6 which extend substantially linearly between the presses 2 and 4, as best seen in Figure 2.

The body 60 supports a rotatable plate or turntable 61 mounted as by a conventional ball or roller bearing unit 62. A pair of clamping levers 64 are pivotally fulcrumed as at 66 to the turntable 61 and carry clamps 68 for engagement with a workpiece diagrammatically indicated at 70 in Figures 3 and 4.

Equalizer links 72 are pivotally connected as at 74 (Figure 3) to the levers 64, said links being pivoted at 76 to an equalizer 78 which is pivoted at 80 to the turntable 61. This arrangement ensures equal travel of the levers 64 during clamping and release thereof, as hereinafter described and maintains the clamp members 68 at a substantially equal distance from the longitudinal center line of the cart 9, so that the clamps 68 will be in proper position relative to the presses 2 and 4 during operation of the cart.

The levers 64 are actuated by a conventional fluid pressure reciprocal motor illustrated as a pneumatic motor 82 having a cylinder 84 containing a piston, the piston rod 98 of which is pivotally connected as at 100 to one of the levers 64. The cylinder 84 is pivotally connected as at 102 to the other lever 64.

The motor 82 is actuated as by a pneumatic system shown in Figure 2 including an operating valve 104 connected to a shop air line 106. The valve 104 is normally biased to release position whereat compressed air from the shop air line 106 is admitted to a release line 108 and air in the clamp line 110 is exhausted whereby the clamps 68 are urged apart. Upon energization of a solenoid 112 associated with the valve 104, compressed air from the shop air line is admitted to clamp line 110, and air in release line 108 is exhausted, whereupon the pneumatic motor 82 actuates the levers 64 to clamp the clamps 68 against a workpiece 70 as heretofore described.

Referring again to Figures 2 and 3, it will be seen that the turntable 61 is keyed to a lever 114 carrying a cam roller 116 which is confined in a track 118 between the rails 6, said track being offset centrally as at 120 (Figure 2), so that movement of the cart 9 toward either press 2 or 4 causes the roller 116 to enter the offset 120 thereby rotating the table 61 so that the clamps 68 face the press toward which the cart is moving.

Referring now to Figures 1, 2 and 5, the electrical system of Figure 5 and the automatic actuation thereby of the novel transfer device will be described in connection with an operating cycle thereof.

After a workpiece 70 has been pierced by the press, the operator closes a pushbutton switch 122 establishing an electrical circuit between main lines 124 and 126 connected to opposite terminals of a conventional voltage supply such as a transformer 128, said line 124 having a normally closed emergency pushbutton switch 130. The electrical circuit established by closing of the before mentioned pushbutton 122 may be traced through normally closed relay switches CR–4(a) and CR–5(c) and through a control relay CR–1 thereby energizing the latter.

Energization of control relay CR–1 closes its normally open switch CR–1(a) thereby establishing a holding circuit through the relay CR–1 which also closes its normally open relay switches CR–1(b), CR–1(c) and CR–1(d). Closing of normally open switches CR–1(c) and CR–1(d) energizes solenoid 22 (Figures 1 and 5) which actuates the control valve 20 to advance position thereof, whereupon the cart 9 is moved as above described toward the piercing press 4 until the clamps 68 are in position to receive the pierced workpiece 70 therebetween.

The cart at this point closes a normally open limit switch LS–1 establishing an electrical circuit through relay switch CR–1(b) (now closed) and through normally closed relay switch CR–4(b) and control relay CR–2, thereby energizing the latter which closes a holding circuit therethrough by closing its normally open relay switch CR–2(a).

Energization of control relay CR–2 also closes its normally open relay switches CR–2(b), CR–2(c) and CR–2(d). Closing of relay switches CR–2(c) and CR–2(d) energizes solenoid 46 (Figures 1 and 2) actuating valve 44 to its advance position, whereat the ejector 32 pushes the workpiece upwardly between the clamps 68 whereupon the ejector closes a normally open limit switch LS–2.

Closing of limit switch LS–2 establishes an electrical circuit through relay switch CR–2(b) (now closed), through normally closed relay switch CR–6(b) and through a control relay CR–3 which is thus energized and establishes a holding circuit therethrough by closing its normally open relay switch CR–3(a). Relay CR–3 when energized also closes its normally open relay switches CR–3(b), CR–3(c), CR–3(d) and CR–3(e). Closing of switches CR–3(d) and CR–3(e) energizes solenoid 112 (Figures 2 and 5) which actuates air valve 104 to its clamping position whereat the pneumatic motor 82 acting on the levers 64 urges the clamp members 68 against the workpiece 70 as shown in Figure 4.

As pressure builds up in the clamping line 110 (Figure 2), this pressure closes a normally open switch PS–1 thereby establishing an electrical circuit through normally closed contacts 132 and 134 of a limit switch LS–3 and through relay switch CR–3(b) (now closed) and through a control relay CR–4.

Energization of control relay CR–4 opens its normally closed switches CR–4(a) and CR–4(b), thereby de-energizing control relays CR–1 and CR–2 returning their relay switches to normal position and consequently de-energizing solenoid 22 and 46. At the same time, control relay CR–4 closes its normally open switches CR–4(c) and CR–4(d) energizing solenoid 48 (Figures 1 and 5), thereby actuating the control valve 44 to its pullback position, whereupon the ejector 32 is lowered to its pullback or retracted position shown in Figure 1 at which position the ejector 32 trips limit switch LS–3 opening its normally closed contacts 132 and 134 and closing normally open contacts 136 and 138 of switch LS–3.

Opening of the contacts 132 and 134 de-energizes control relay CR–4 returning its relay switches to normal position, thereby de-energizing solenoid 48 so that the valve 44 returns to neutral position.

Closing of contacts 136 and 138 establishes an electrical circuit through relay switch CR–3(c) (now closed), through a normally closed time delay switch TDR(b) and through a control relay CR–5 which is thus energized and establishes a holding circuit therethrough by closing its normally open switch CR–5(a). The relay CR–5 when energized also closes its normally open switches CR–5(b), CR–5(c) and CR–5(d).

Closing of switches CR–5(c) and CR–5(d) energizes solenoid 24 (Figures 1 and 5) which thus actuates control valve 20 to its reverse or pullback position thereof, whereupon the hydraulic motor 10 moves the cart toward the press 2, thereby automatically rotating the table 61, as above described, so that the workpiece 70 clamped between the members 68 enters the press 2, at which time a normally open limit switch LS–4 is closed by the cart 9.

Closing of switch LS–4 establishes an electrical circuit through relay switch CR–5(b) (now closed) and through a control relay CR–6 and a time delay relay TDR, which is in parallel with switch CR–6. Relay CR–6 when energized closes a holding circuit therethrough and through relay TDR by closing the normally open switch CR–6(a) of relay CR–6, and relay CR–6 also opens its normally open switch CR–6(b) de-energizing the control relay CR–3 so that its switches return to normal position, thereby de-energizing the solenoid 112 (Figures 2 and 5). As the solenoid 112 is de-energized, its valve 104 returns to normal release position whereat pneumatic pressure in the clamping line 110 is exhausted and pneumatic pressure from the air line 106 is delivered to the release line 108 to actuate the levers 64 to their release position, whereat the clamps 68 release the workpiece 70 which drops into the drawing press 2.

Closing of the limit switch LS–4 by the cart 9, as above described, also energizes the time delay TDR which after a predetermined time interval of, for example, two seconds closes its normally open switch TDR(a) and opens it normally closed switch TDR(b). Closing of switch TDR(a) energizes the control delay CR–1 at the same time that opening of switch TDR(b) deenergizes control relay CR–5 returning its switches to normal position, thereby de-energizing the solenoid 24 at the same time that the normally open relay switches CR–1(c) and CR–1(d) due to energization of control relay CR–1 by closing of switch TDR(a), as above described, energizes solenoid 22 which actuates its control valve 20 to advance position whereat the hydraulic motor 10 moves the cart 9 forwardly toward the press 4 until the cart opens a normally closed limit switch LS–5 (Figures 1 and 5), thereby de-energizing control relays CR–1 and CR–6 as well as time delay relay TDR, whereupon the operating cycle is completed and the cart 9 is approximately midway between the presses 2 and 4 preparatory to initiation of a new cycle by the operator.

Referring now to Figure 6, which is a side elevational view of a modified transfer cart 9 and actuating mechanism similar to the view of Figure 4, parts corresponding to those shown in Figure 4 are identified by corresponding numerals. It will be understood that the modification of Figure 6 is substantially identical with that of Figure 4, except that the cart 9 is moved back and forth between the presses along the rails 6 by means of a chain 140, the ends of which are anchored as at 142 to the cart 9, said chain being engaged with sprockets 144, 146 and 148. The chain is driven by a sprocket 150 actuated by a conventional reversible rotary fluid motor 152.

Thus it will be understood in the modification of Figure 6, the cart is actuated by a rotary motor 152 and chain 140 as distinguished from the reciprocal type motor 10 of the preceding embodiment. However, it will be readily understood by those skilled in the art that the above described automatic operation of the system is not affected by the modification of the motor means for the cart 9 as shown in Figure 6.

I claim:

1. In an automatic transfer device; the combination of clamping means movable back and forth between two stations, means for automatically rotating the clamping means to face toward either station as the clamping means moves toward the latter, means for moving the clamping means toward one of such stations, means for automatically ejecting a workpiece from said one station into said clamping means when the latter reaches a predetermined position in its movement toward said one station, means responsive to operation of said ejecting means for automatically actuating said clamping means to clamp said workpiece, means responsive to actuation of said clamping means for automatically retracting said ejecting means from said workpiece, means responsive to retraction of said ejecting means for automatically moving said clamping means toward the other station, and means responsive to a predetermined movement of said clamping means toward said other station for automatically releasing said clamping means to deposit the workpiece at said other station.

2. In an automatic transfer device; the combination of clamping means movable back and forth between two stations, means for automatically rotating the clamping means to face toward either station as the clamping means moves toward the latter, means for moving the clamping means toward one of such stations, means for ejecting a workpiece from said one station into said clamping means when the latter reaches a predetermined position in its movement toward said one station, means responsive to ejection of said workpiece for automatically actuating said clamping means to clamp said workpiece, means responsive to actuation of said clamping means for automatically moving the latter toward the other station, and means responsive to a predetermined movement of said clamping means toward other said station for automatically releasing said clamping means to release the workpiece at said other station.

3. In an automatic transfer device; the combination of clamping means movable back and forth between two stations, means for automatically rotating the clamping means to face toward either station as the clamping means moves toward the latter, means for moving the clamping means toward one of such stations, means for automatically ejecting a workpiece from said one station into said clamping means when the latter reaches a predetermined position in its movement toward said one station, means responsive to ejection of said workpiece for automatically actuating said clamping means to clamp said workpiece, means responsive to actuation of said clamping means for automatically moving the latter toward the other station, and means responsive to a predetermined movement of said clamping means toward other said station for automatically releasing said clamping means to release the workpiece at said other station, and for then moving said clamping means toward said one station.

4. In an automatic transfer device; the combination of clamping means movable back and forth between two stations, means for automatically rotating the clamping means to face toward either station as the clamping means moves toward the latter, means for moving the clamping means toward one of said stations, means for ejecting a workpiece from said one station into said clamping means when the latter reaches a predetermined position in its movement toward said one station, means responsive to operation of said ejecting means for automatically actuating said clamping means to clamp said workpiece, means responsive to actuation of said clamping means for automatically moving the latter toward the other station, means responsive to a predetermined movement of said clamping means toward other said station for automatically releasing said clamping means to release the workpiece at said other station and for then moving said clamping means toward said one station, and means for automatically terminating said last mentioned movement of the clamping means at a position between said stations.

5. In a transfer system for a workpiece to be acted on by a pair of working devices; the combination of a cart movable back and forth between said devices, a track extending between the devices, said track having an offset portion intermediate the devices, a turntable rotatably supported by the cart and carrying a cam within said track, and a clamping mechanism mounted on said turntable for clamping said workpiece, whereby the clamping mechanism faces one or the other of said devices on movement of the cart toward that device.

6. In a transfer system for a workpiece to be acted on by a pair of working devices; the combination of a rail extending substantially linearly between said devices, a cart having a wheel rolling on said rail, a track extending between the devices and having an offset portion at a point intermediate the devices, a member rotatably supported by the cart and carrying a cam engaging said track, and means supported by said member for releasably clamping said workpiece, whereby the clamping means face the device toward which the cart moves.

7. In a transfer system for a workpiece to be acted on by a pair of working devices; the combination of a track extending between the devices and having an offset portion intermediate the devices, a clamping mechanism reciprocal between the devices and having a cam engaged with the track for rotating the mechanism to face the device toward which the mechanism moves, and means for reciprocating the mechanism.

8. In an automatic transfer device for a pair of presses; the combination of a pair of rails extending substantially linearly between the presses, a track between said rails extending between the presses, said track having an offset portion intermediate said presses, a transfer cart having wheels supported by the rails, said cart having a member rotatably supported thereby, a clamping mechanism carried by said member, a cam keyed to said member, said cam being engaged with and guided by the track, whereby upon movement of the cart toward either press said member is rotated by said cam so that the clamping mechanism faces the last mentioned press, means for moving the cart toward one of said presses, means for automatically ejecting a workpiece from said one press into said clamping mechanism when said cart reaches a predetermined position in its movement toward said one press, means responsive to actuation of said ejecting means for actuating said clamping mechanism to clamp said workpiece, means responsive to actuation of said clamping mechanism for retracting said ejecting means from the workpiece, means responsive to retraction of said ejecting means for automatically moving said cart toward the other press, and means responsive to a predetermined position of said cart in its movement toward said other press for releasing the clamping mechanism and then moving said cart toward said one press.

9. In an automatic transfer device for a pair of presses; the combination of a cart movable back and forth between the presses, a turntable rotatably mounted on the cart, a clamping mechanism carried by the turntable, means for automatically rotating the turntable to face the clamping mechanism toward either press when the cart is moving toward the latter, means for moving the cart toward one of the presses, means for automatically ejecting a workpiece from said one press into said clamping mechanism when said cart reaches a predetermined position in its movement toward said one press, means responsive to actuation of said ejecting means for automatically actuating said clamping mechanism to clamp said workpiece, means responsive to actuation of said clamping mechanism for automatically retracting said ejecting means from the workpiece, means responsive to retraction of said ejecting means for automatically moving said cart toward the other press, and means responsive to a predetermined movement of said cart toward said other press for releasing said clamping mechanism to drop the workpiece into said other press.

10. In a transfer system for a workpiece to be acted on by a pair of working devices; the combination of a rail extending substantially linearly between said devices, a cart having a wheel rolling on said rail, a cam track extending between the devices and having an offset portion at a point intermediate the devices, a member rotatably supported by the cart and carrying a cam engaging said track throughout the travel of said cart, and means supported by said member for releasably clamping said workpiece, whereby the clamping means faces the device toward which the cart moves, said means comprising a pair of levers fulcrumed to said member, a power device comprising a cylinder pivoted to one of the levers and a piston having a rod fulcrumed to the other lever, and equalizer means for the levers comprising an equalizer pivoted to said member, and links pivoted to said equalizer and to the respective levers.

11. In a transfer system for a workpiece to be acted on by a pair of working devices; the combination of a cart movable back and forth between said devices, a track extending between the devices, said track having an offset portion intermediate the devices, a turntable rotatably supported by the cart and carrying a cam within said track, and a clamping mechanism mounted on said turntable for clamping said workpiece, whereby the clamping mechanism faces one or the other of said devices on movement of the cart toward the device, means to actuate said clamping mechanism to clamp a workpiece received from one of said devices, and means operably responsive to movement of said cart toward the other of said devices to release said clamping mechanism to drop the workpiece.

12. In a transfer system for a workpiece to be acted on by a pair of working devices; the combination of a cart movable back and forth between said devices; a track extending between the devices, said track having an offset portion intermediate the devices, a turntable rotatably supported by the cart and carrying a cam within said track, and a clamping mechanism mounted on said turntable for clamping said workpiece, whereby the clamping mechanism faces one or the other of said devices on movement of the cart toward that device, means to actuate said clamping mechanism to clamp a workpiece received from one of said devices, and means operably responsive to movement of said cart toward the other of said devices to release said clamping mechanism to drop the workpiece, and means for reciprocating the cart.

References Cited in the file of this patent

UNITED STATES PATENTS

| 666,123 | Wellman et al. | Jan. 15, 1901 |
| 1,047,257 | Loubriat | Dec. 17, 1912 |
| 2,154,992 | Pearson | Apr. 18, 1939 |
| 2,524,846 | Socke et al. | Oct. 10, 1950 |
| 2,544,218 | Burdsall | Mar. 6, 1951 |
| 2,609,776 | Sahlin | Sept. 9, 1952 |
| 2,611,498 | Broersma | Sept. 23, 1952 |